(12) United States Patent
Yamamoto et al.

(10) Patent No.: US 10,101,957 B2
(45) Date of Patent: Oct. 16, 2018

(54) IMAGE PROCESSING DEVICE FOR IMAGE PROJECTION, IMAGE PROJECTION APPARATUS, AND IMAGE PROCESSING METHOD

(71) Applicant: Panasonic Intellectual Property Management Co., Ltd., Osaka-shi, Osaka (JP)

(72) Inventors: Masahiko Yamamoto, Osaka (JP); Hideo Onishi, Osaka (JP); Kou Watanabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/407,250

(22) Filed: Jan. 16, 2017

(65) Prior Publication Data

US 2018/0020199 A1    Jan. 18, 2018

Related U.S. Application Data

(60) Provisional application No. 62/362,601, filed on Jul. 15, 2016.

(51) Int. Cl.
*H04N 3/22* (2006.01)
*G06F 3/14* (2006.01)
(Continued)

(52) U.S. Cl.
CPC ....... *G06F 3/1431* (2013.01); *G02B 26/0833* (2013.01); *G03B 21/28* (2013.01);
(Continued)

(58) Field of Classification Search
CPC .... H04N 9/3179; H04N 9/3155; H04N 9/317; H04N 9/3191; G02B 26/0833; G03B 21/28
(Continued)

(56) References Cited

U.S. PATENT DOCUMENTS 5,260,797 A    11/1993    Muraji et al.
5,838,396 A    11/1998    Shiota et al.
(Continued)

FOREIGN PATENT DOCUMENTS

EP    2876876 A2    5/2015
JP    H03-011390 A    1/1991
(Continued)

OTHER PUBLICATIONS

The Partial European Search Report from the corresponding European Patent Application No. 17151597.6 dated Sep. 20, 2017.
(Continued)

*Primary Examiner* — Trang U Tran
(74) *Attorney, Agent, or Firm* — Shinjyu Global IP

(57) ABSTRACT

An image processing device performs image processing on image data for projection into a projection area. The image processing device comprises a memory and an image processor. The memory at least temporarily stores image data. The image processor specifies a certain area that is part of the projection area and extends from one end of the projection area, and corrects the image data so as to satisfy a certain condition on the basis of the specification of the certain area. The certain condition is that the correction amount A for the brightness of the image data portion to be projected into the certain area and the correction amount B for the brightness of the other image data portion in the projection area satisfy the relation A<B.

16 Claims, 13 Drawing Sheets

(51) Int. Cl.
*H04N 9/31* (2006.01)
*G08G 5/00* (2006.01)
*H04N 21/414* (2011.01)
*G02B 26/08* (2006.01)
*G03B 21/28* (2006.01)

(52) U.S. Cl.
CPC ........... *G08G 5/0021* (2013.01); *H04N 9/317* (2013.01); *H04N 9/3147* (2013.01); *H04N 9/3155* (2013.01); *H04N 9/3179* (2013.01); *H04N 9/3182* (2013.01); *H04N 9/3185* (2013.01); *H04N 9/3191* (2013.01); *H04N 21/41422* (2013.01)

(58) Field of Classification Search
USPC .................................................. 348/744, 745
See application file for complete search history.

(56) References Cited

U.S. PATENT DOCUMENTS

| | | | |
|---|---|---|---|
| 6,964,481 B2 | 11/2005 | Pho et al. | |
| 7,097,307 B2 | 8/2006 | Lawrence | |
| 7,926,957 B2* | 4/2011 | Miyazawa | G03B 21/10 348/745 |
| 8,736,696 B2* | 5/2014 | Kumagai | H04N 5/3572 348/218.1 |
| 8,754,840 B2* | 6/2014 | Miura | H04N 9/3182 345/102 |
| 8,806,543 B1 | 8/2014 | Curtis et al. | |
| 9,158,185 B2 | 10/2015 | Petrisor | |
| 9,341,307 B2 | 5/2016 | Seal | |
| 9,547,228 B2* | 1/2017 | Kim | G06F 3/1446 |
| 2002/0070944 A1 | 6/2002 | Deering | |
| 2007/0046901 A1 | 3/2007 | Kuno | |
| 2009/0059097 A1 | 3/2009 | Miura | |
| 2012/0019670 A1 | 1/2012 | Chang et al. | |
| 2012/0069022 A1 | 3/2012 | Majumder et al. | |
| 2014/0204343 A1 | 7/2014 | Choi et al. | |
| 2015/0054848 A1 | 2/2015 | Kim et al. | |

FOREIGN PATENT DOCUMENTS

| | | |
|---|---|---|
| JP | H08-223519 A | 8/1996 |
| JP | 2004-312480 A | 11/2004 |
| JP | 2009-058786 A | 3/2009 |
| JP | 2015-043573 A | 3/2015 |
| WO | 2015036501 A2 | 3/2015 |

OTHER PUBLICATIONS

The Office Action from the co-pending U.S. Appl. No. 15/404,145 dated Sep. 26, 2017.

The Search Report from the corresponding European Patent Application No. EP17151597.6 dated Feb. 27, 2018.

* cited by examiner

IMAGE PROCESSING DEVICE FOR IMAGE PROJECTION, IMAGE PROJECTION APPARATUS, AND IMAGE PROCESSING METHOD

CROSS-REFERENCE TO RELATED APPLICATIONS

This patent application claims the benefit of U.S. Provisional Patent Application 62/362,601, filed Jul. 15, 2016, the disclosure of which are incorporated herein by reference.

BACKGROUND

Technical Field

The present disclosure relates to an image processing device and an image processing method for an image or video that is projected by a projector or another such image projection apparatus.

Description of the Related Art

Recent years have seen the use of projectors (image projection apparatuses) that form an optical image by modulating light emitted from a lighting apparatus equipped with an LED (light emitting diode) or other such light source according to image information or video information, and enlarge the optical image thus formed and project it onto a screen.

Of these, ultra-short focus projectors that make use of a mirror as part of the projection optical system can be used very close to the screen, which means that the shadows of people and things are less likely to block the projection, and therefore these projectors are often used in educational settings, for projection mapping, and so forth.

With a conventional projector, however, depending on the environment of the projection area, the effect of reflected light and so forth can affect the quality of the projected image. For example, uneven brightness may stand out when an optical image projected onto a screen is viewed at an angle. With a ultra-short focus projector, the angle of incidence on the screen will vary greatly with the projection area, so uneven brightness will often stand out.

SUMMARY

The present disclosure is related to an image processing device, an image projection apparatus, and an image processing method that are effective at improving the quality of the projected image. The image processing device pertaining to the present disclosure performs image processing on image data for projecting into a projection area, and comprises a memory and an image processor. The memory at least temporarily stores the image data. The image processor specifies a certain area that is part of the projection area and extends from one end of the projection area, and corrects the image data so as to satisfy a certain condition on the basis of the specification of the certain area. The certain condition is that a correction amount A for brightness of an image data portion to be projected into the certain area and a correction amount B for brightness of the other image data portion in the projection area satisfy a relation A<B.

The image projection apparatus pertaining to the present disclosure comprises the above-mentioned image processing device, a light source, an optical system that produces image light from light emitted by the light source, on the basis of the image data, a projection aperture through which the image light is projected toward the projection area, and an optical controller that controls the light source and the optical system.

The image processing method pertaining to the present disclosure is a method with which image data for projection into a projection area is subjected to image processing, said method including specifying a certain area that is part of the projection area and extends from one end of the projection area, correcting the image data so as to satisfy a certain condition on the basis of the specification of the certain area, and outputting the corrected image data. The certain condition is that a collection amount A for brightness of an image data portion to be projected onto the certain area and a correction amount B for brightness of the other image data portion in the projection area satisfy a relation A<B.

The image processing device, the image projection apparatus, and the image processing method disclosed herein are effective at improving the quality of a projection image.

DESCRIPTION OF THE INVENTION

Embodiments will now be described in detail through reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The inventors have provided the appended drawings and the following description so that a person skilled in the art might fully understand this disclosure, but does not intend for these to limit what is discussed in the claims.

In the following description, the term "image" is used as encompassing the sense of both still pictures and moving pictures, and unless otherwise specified, "image" shall be used to encompass "video" as well. Also, in the following description, "projection area" refers to the range or area in which an image can be projected, or to the range or area in which an image is predetermined to be projected.

Embodiment 1

The projector 1 pertaining to Embodiment 1 of the present invention will now be described through reference to FIGS. 1 to 5. In this embodiment, we shall describe an example of a projector that projects an image or video (hereinafter referred to simply as an image) onto a projection area corresponding to a screen that is provided to the ceiling inside an aircraft, for example.

Figure 1:
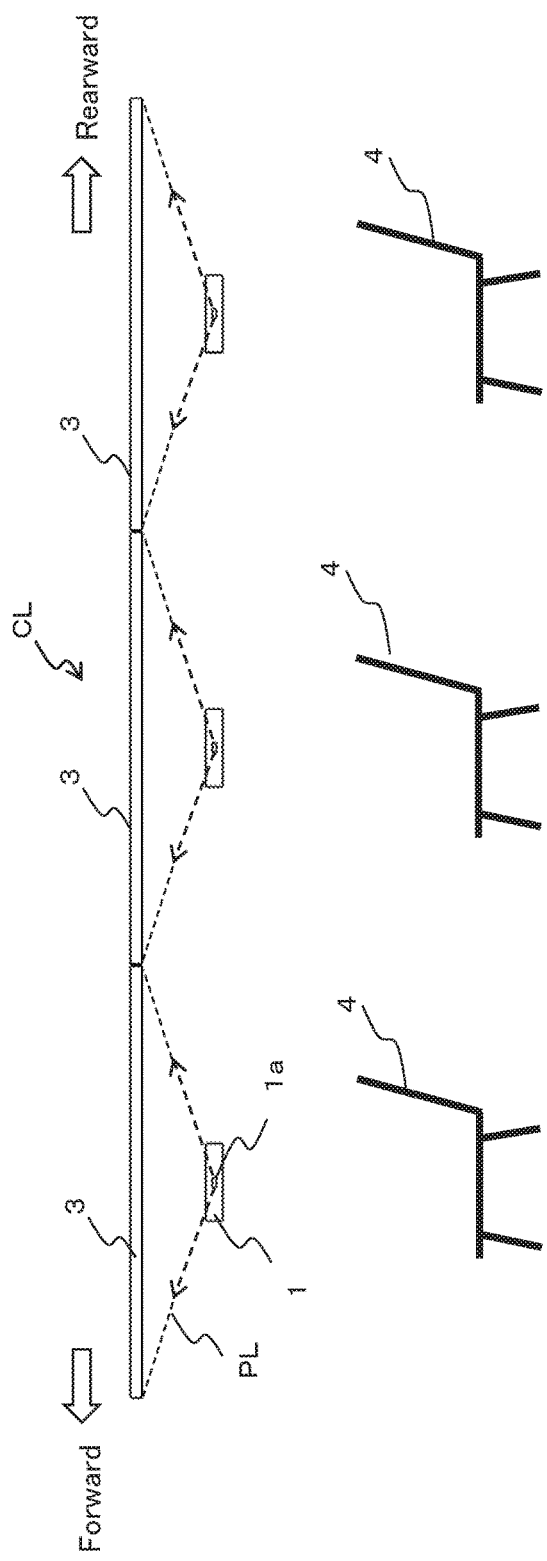
FIG. 1 is a simplified view of the layout of projectors pertaining to Embodiment 1.

FIG. 1 is a simplified view of the layout of the projectors 1 pertaining to this embodiment. As shown in this drawing, the projectors 1 pertaining to this embodiment project projection light PL obliquely upward through a projection aperture 1*a*, so that the image is projected in a projection area 3 provided on the ceiling CL (an example of a projection area). Projecting the image obliquely upward is made possible by using at least one mirror included in an optical unit 50 provided near the projection aperture 1*a* in the projector 1 (discussed below).

The seats 4 are installed so that the passengers are seated facing in the forward direction of the arrow shown in FIG. 1, and when a person is seated in a seat 4 and looks at the image projected in the projection area 3 of the ceiling CL, the projection area 3 that is obliquely upward looks natural. FIG. 1 is a simplified view of the positional relation between the seats 4 and the projection areas 3, and neither the numbers of these nor the ratio of these numbers is limited to what is shown in the example. It is assumed that usually a plurality of the seats 4 are also disposed in a row in the direction perpendicular to the plane of the drawing.

Figure 2:
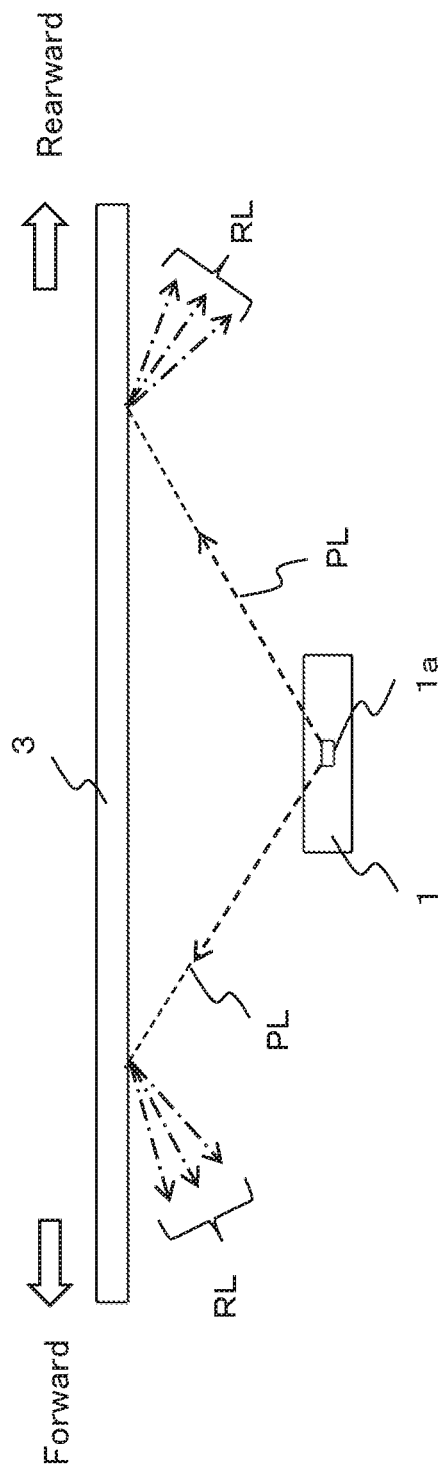
FIG. 2 is a detail view of the layout of the projectors in FIG. 1.
Figure 3:
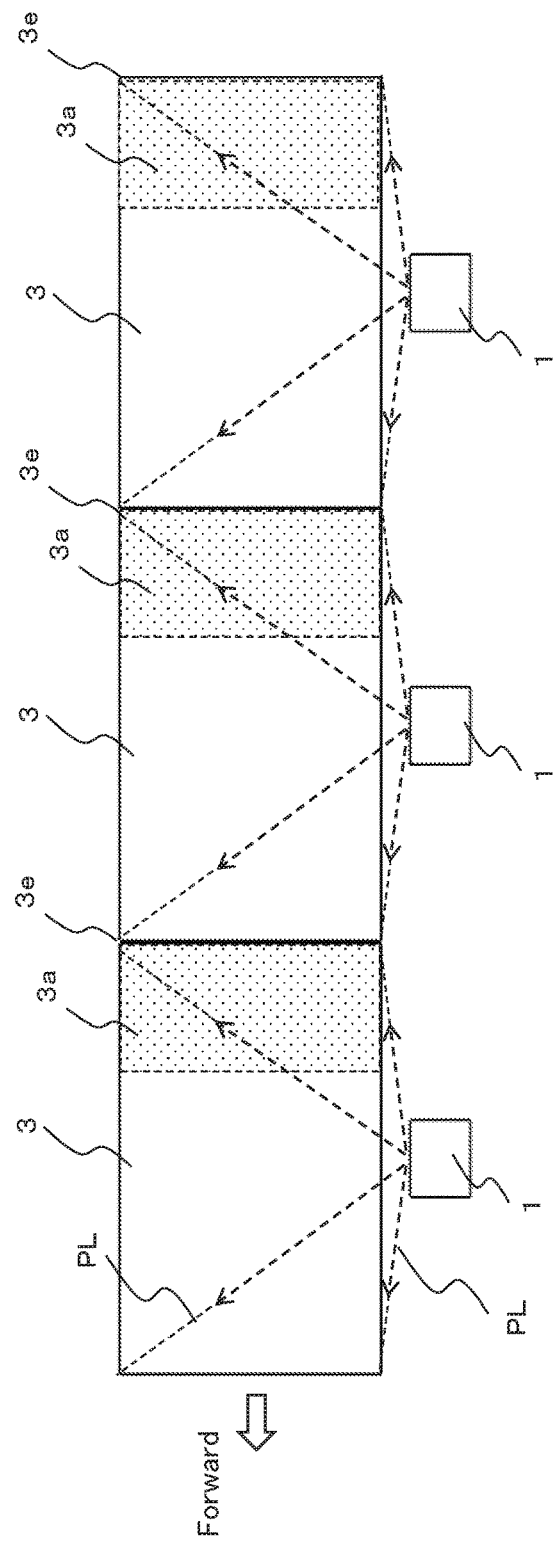
FIG. 3 shows the layout of the projection area and the projectors in FIG. 1 as seen from below.

As shown in FIG. 2, the projection area 3 is a surface that will diffuse and reflect the projection light PL to a certain extent, but the reflection component that is close to specular reflection is somewhat stronger than the other diffused portion. Accordingly, the projection light PL projected forward and rearward is reflected strongly in the direction of the reflected light RL, so when passengers sitting in the seats 4 in FIG. 1 look at the projected images, the part of each projection area 3 near the rear will look brighter than the part near the front. In view of this, as shown in FIG. 3, the projection light PL to a rearward area 3*a* (an example of a certain area) that is part of the projection area 3 and extends from the end 3*e* (an example of one end of the projection area) is made darker than the rest of the area, so that the brightness of the image will look uniform to a passenger sitting in a seat 4. Accordingly, the projectors 1 are disposed so that the projection areas 3 are located above the seats 4 and the rearward areas 3*a* are located ahead of the line of sight of the passengers.

This is accomplished by first producing an image so that the image data portion corresponding to the rearward area 3*a* of the projection area 3 is darker, and then outputting this by control with the DMD (a light modulation element) of the projector 1.

The configuration of the projector 1 pertaining to this embodiment will now be described.

1-1. Configuration

Figure 4:
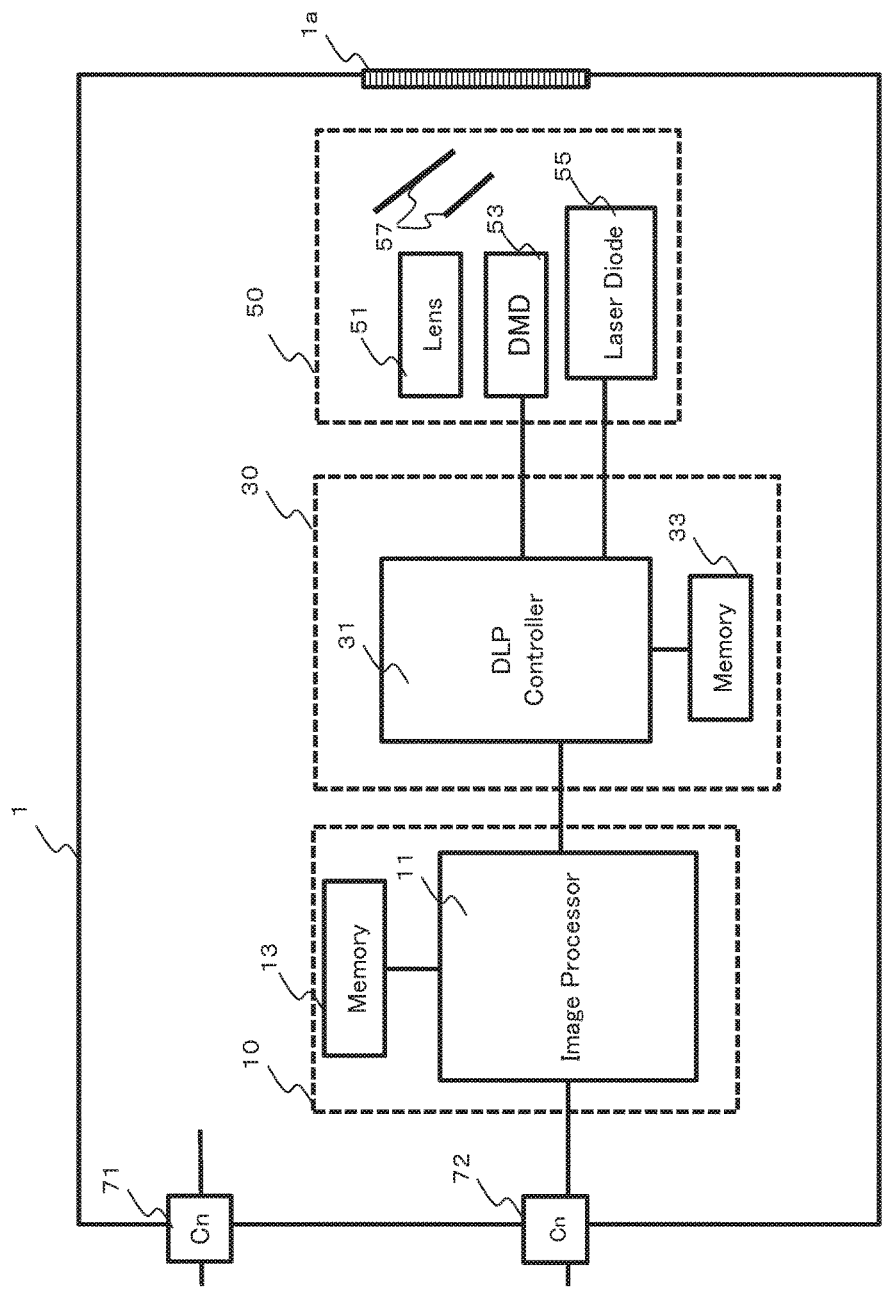
FIG. 4 is a simplified view of the configuration of a projector.

FIG. 4 is a simplified view of the configuration of a projector 1. The projector 1 is connected by wire or wirelessly to an image supply device such as a server (not shown), which is a computer device. The projector 1 projects image light into the projection area 3 on the basis of digital image data or an analog image signal supplied from the image supply device. The projector 1 may read the image data stored in an externally connected memory medium or in a built-in memory unit (not shown), and may project the image light into the projection area 3 on the basis of this image data.

As shown in FIG. 4, the projector 1 mainly comprises an image processing unit 10 (an example of an image processing device), an optical control unit 30 (an example of an optical controller), and the optical unit 50. The projector 1 also comprises a connection 71 for inputting direct current or alternating current, such as a DC terminal or an AC terminal, and a connection 72 that receives image signals. The connection 72 receives either digital signals or analog signals. The connection 72 may be a connection that is connected to the Ethernet (registered trademark) or another such network.

The image processing unit 10 includes an image processor 11 (an example of an image processor) and a memory 13 (an example of a memory). The image processor 11 includes a circuit that executes a specific program and thereby executes specific image processing on the image data that is used for projection. The image processing includes, for example, processing to determine whether the image is a 3D (stereoscopic) image or a 2D (flat) image, resolution conversion processing, frame rate conversion processing, distortion correction processing, digital zoom processing, color correction processing, brightness correction processing, or the like. The image processing also involves adjusting the amount of correction of the brightness of the image data portion in the rearward area 3*a* of the projection area 3 and in the other area on the basis of projection area information, as will be discussed below.

The memory 13 is made up of one or more memories, and includes a ROM (read only memory), a RAM (random access memory), etc. The memory 13 may also include a frame memory. The memory 13 includes a working memory for temporarily storing image data and programs.

The image processor 11 extracts inputted image data into the memory 13, and executes the above-mentioned various kinds of image processing on the extracted image data. The image processor 11 also reads the image-processed image data from the memory 13, produces R, G, and B image signals corresponding to this image data, and outputs the result to the optical control unit 30.

The optical control unit 30 (an example of an optical controller) includes a DLP (digital light processing) controller 31 and a memory 33. The DLP controller 31 is a processor or a circuit that controls a DMD (digital micromirror device) 53 or a laser diode 55 of the optical unit 50 according to the image signal inputted from the image processing unit 10. The DLP controller 31 executes display control over the DMD 53, rotation control over a color wheel (not shown), emission control over the laser diode 55, and so on. The memory 33 includes a working memory for temporarily storing image signals and programs.

The optical unit 50 comprises a lens system 51 (an example of an optical system), a DMD 53, a laser diode 55 (an example of a light source), and a mirror 57. The lens system 51 is made up of a plurality of lens groups disposed along the optical axis, such as a lens that enlarges the image light and projects it into the projection area 3, and a zoom lens that enlarges, reduces, and adjusts the focus of a projected image. The lens system 51 guides the image light formed in the DMD 53 to the mirror 57, and this light is reflected by the mirror 57. The mirror 57 comprises two mirrors, for example, one of which reflects light emitted from the lens system 51 and guides it to the other mirror, where the light is then reflected by this second mirror, goes through a protective glass (not shown) provided in a projection aperture 1a, and is projected onto the ceiling CL. The DMD 53 is a light modulation element in which numerous movable micro-mirrors are arranged two-dimensionally on an integrated circuit. The DMD (light modulation element) 53 modulates light emitted from the laser diode 55 by means of the mirror elements on the surface, and emits the light at the lens system 51. The DMD 53 also forms image light by modulating the light on the basis of the inputted image signal. The laser diode 55 is the light source for the projector 1, and shines light at the DMD 53.

The projector 1 also has the projection aperture 1a (an example of a projection aperture). As shown in FIG. 3, the projection aperture 1a is disposed opposite the projection area 3, so that light (image light) is projected obliquely into the projection area 3. Also, the plane of the projection aperture 1a perpendicular to the direction in which the light is projected is parallel to a plane that includes the projection area 3.

Projection Area Information

Projection area information includes coordinate information and the reflectivity of the projection area 3. Information related to screen characteristics, such as the reflection brightness of the projection area 3 (the ratio of the brightness of reflected light to the projected light) or reflection characteristics (viewing angle characteristics), may be stored ahead of time in the memory 13 or in an external memory means, etc. The image processing unit 10 adjusts the overall brightness of the image data according to this screen characteristics.

Coordinate information about the projection area 3 may be obtained as follows, for example. The projection area 3 is imaged with a camera (not shown) built into the projector 1, the image processing unit 10 produces coordinate data about the projection area 3 on the basis of the captured data, and this coordinate data is stored in the memory 13, an external memory means, etc. The coordinate information about the projection area 3 including the rearward area 3a may be stored ahead of time in the memory 13, etc., when the projector 1 is installed, etc.

1-2. Operation

The operation including brightness correction processing performed mainly by the image processing unit 10 of the projector 1 will now be described through reference to the flowchart in FIG. 5. In the following description, of the image processing executed by the image processing unit 10, we will describe brightness correction processing of the image data. Other image processing shall be assumed to be executed when needed after an image signal has been acquired, and will not be described here.

S1001: First, with the power switched on, the image processor 11 of the image processing unit 10 of the projector 1 acquires an image signal (including a video signal) via the connection 72. The acquired image signal is stored in frame units in the memory 13 as image data.

S1002: The image processor 11 acquires projection area information. The projection area information includes coordinate information about the projection area 3.

S1003: The image processor 11 specifies coordinate information for the rearward area 3a out of the coordinate information for the projection area 3.

S1004: The image processor 11 acquires coordinate information for the image data obtained from the memory 13. The coordinate information for the image data is produced so as to be compatible with the coordinate information for the projection area 3.

S1005: The image processor 11 determines the coordinates of the image data portion corresponding to the rearward area 3a.

S1006: The image processor 11 adjusts the correction amount for the brightness of the image data on the basis of the determination of the coordinates of the image data portion corresponding to the rearward area 3a. Here, adjusting the correction amount for the brightness of the image data means adjusting the correction amount for the brightness in the image data portion in the rearward area 3a and the correction amount for the brightness in the other image data portion in the projection area 3.

The amount of brightness correction is, for example, a value based on the difference between the brightness of the image data portion prior to correction by the image processor 11 and the brightness of the image data portion after correction. The brightness of the image data portion in each area (the rearward area 3a, another area, etc.) may be acquired, for example, from the median value for brightness in each area, the average value, the sum total, or another such statistical value.

The image processor 11 corrects the image data so as to satisfy a certain condition. The certain condition here is that the correction amount A1 for the brightness of the image data portion projected into the rearward area 3a and the correction amount B1 for the brightness of the other image data portion in the projection area 3 satisfy the relation A1<B1. The correction amount is a positive value when the brightness is to be raised, and is a negative value when the brightness is to be lowered.

The brightness correction amount may be a correction amount that includes the correction amount produced by brightness correction processing for some other purpose (gamma correction or the like; brightness correction executed regardless of the specification of the rearward area 3a; the same applies hereinafter), or may be a correction amount produced by just brightness correction in the specified rearward area 3a. In the former case, the correction amount A1 for the brightness of the image data portion projected into the rearward area 3a and the correction amount B1 for the brightness of the other image data portion in the projection area 3 include the correction amount produced by brightness correction performed for some other purpose. In the latter case, while the correction amount B1 for the brightness of the other image data portion in the projection area 3 is set to zero, the correction amount A1 for the brightness of the image data portion projected into the rearward area 3a is calculated.

As a result of adjusting the brightness correction amount, the brightness of the image data portion projected into the rearward area 3a becomes lower than the brightness of this image data portion prior to correction (if the correction amount includes the correction amount produced by brightness correction for some other purpose, then the brightness when this brightness correction has been performed for some other purpose). For example, the brightness in the image data portion of the rearward area 3a after correction is adjusted so as to be at least 90% and less than 100% of the brightness prior to correction. In other words, the correction amount that is the difference between the correction amount A1 and the correction amount B1 corresponds to the amount by which the brightness of the image data is reduced within the range of at least 90% and less than 100% between before and after correction.

S1007: The image processor 11 outputs an image signal corresponding to the corrected image data to the optical control unit 30. The optical control unit 30 controls the optical unit 50 according to the inputted image signal, and projects image light in the projection area 3.

S1008: The image processor 11 determines whether or not there has been a change in the content of the image data or a change in the orientation of the display of image data. If there has been a change, the flow returns to step S1004 and coordinate information is newly acquired for the image data. This is because if the content of the image data has changed, or if the orientation of the image data displayed in the projection area 3 has changed, the coordinates of the image data portion projected in the rearward area 3a will also be different.

S1009: The image processor 11 determines whether or not the input of the image signal has stopped. If the input has stopped, the processing is halted, but if the input has not stopped, the flow returns to step S1007 and image data is outputted.

1-3. Features, Etc

The image processing unit 10 (an example of an image processing device) pertaining to this embodiment performs image processing on image data for projecting into the projection area 3 (an example of a projection area), and comprises the memory 13 (an example of a memory) that at least temporarily stores image data, and the image processor 11 (an example of an image processing component). The image processor 11 specifies the rearward area 3a (an example of a certain area) that is part of the projection area 3 and extends from the end 3e (an example of one end) of the projection area 3, and corrects the image data so as to satisfy a certain condition on the basis of the specification of the rearward area 3a. The certain condition is that the correction amount A1 for the brightness of the image data portion projected into the rearward area 3a and the correction amount B1 for the brightness of the other image data portion in the projection area 3 satisfy the relation A1<B1.

Because the reflection component of the image light that is close to specular reflection in the projection area 3, and particularly the rearward area 3a, is somewhat stronger than the other diffused portion, uneven brightness occurs, particularly when the image of the rearward area 3a is viewed at an angle. This unevenness in brightness stands out particularly when the rearward area 3a is located above the seat of a person (passenger, etc.) viewing the image and in front of this person's line of sight. Therefore, the image processing unit 10 reduces uneven brightness by correcting the value of the correction amount for the brightness of the image data portion of the rearward area 3a to be less than the value of the correction amount for the other area. As a result, the projected image appears to have more uniform brightness, which improves the quality of the projection image.

1-4. Modification Examples

Figure 6:
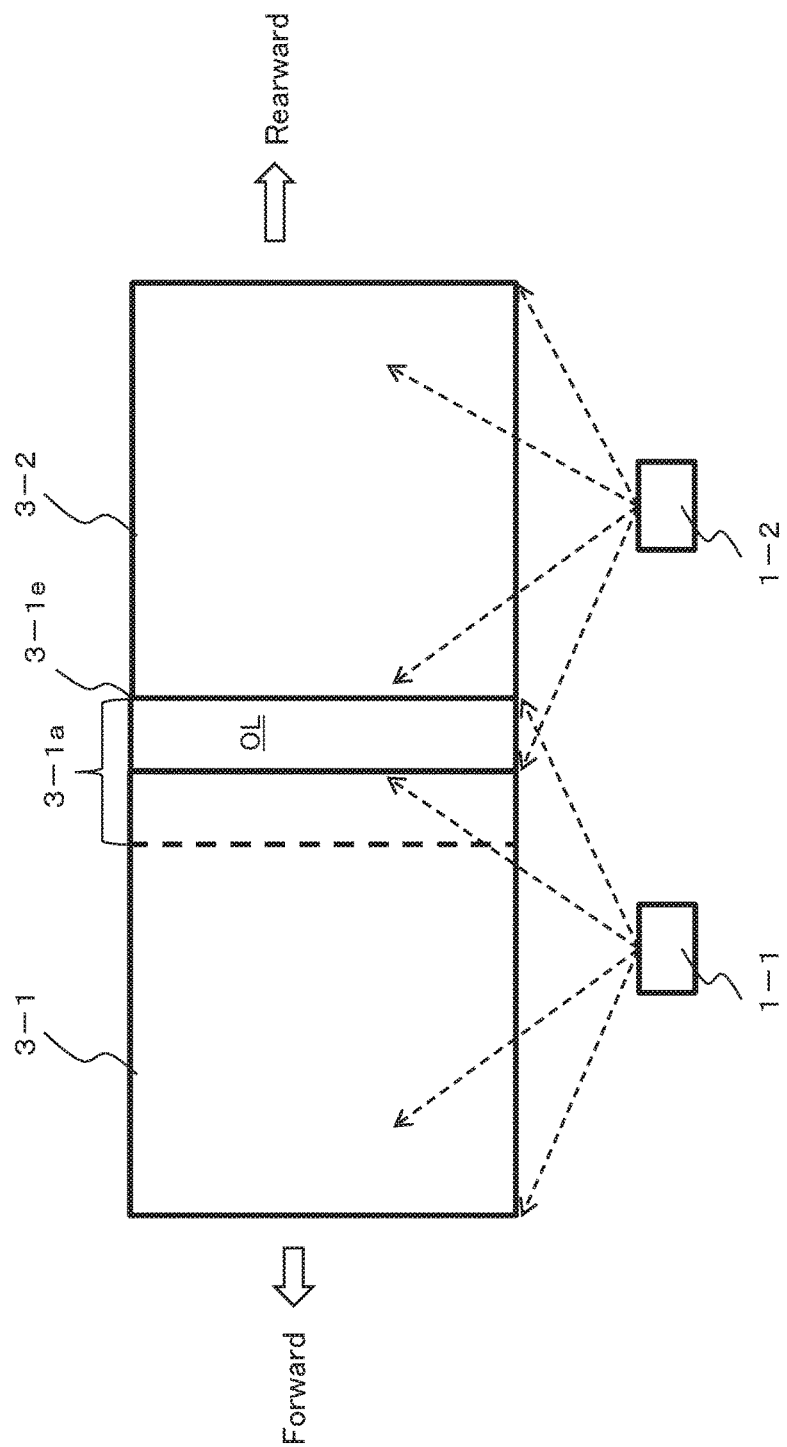
FIG. 6 illustrates a modification example, and shows the layout of the projection area and the projectors as seen from below.

When a single image is displayed using a plurality of projectors 1, for example, two projection areas may overlap. For instance, as shown in FIG. 6, if images are projected into the projection areas 3-1 and 3-2, which are contiguous in the longitudinal direction, then in the rearward area 3-1a (an example of a certain area) that is part of the projection area 3-1 and extending forward from the end 3-1e, there may be an overlapping area OL (an example of an overlapping area) that overlaps the front portion of the projection area 3-2 that continues to the rear. In this case, the overlapping area OL ends up looking brighter than usual. To prevent this, the value of the correction amount for the brightness of the image data portion projected in the overlapping area OL may be corrected to be further less than the value of the correction amount for the other area of the rearward area 3-1a.

Figure 5:
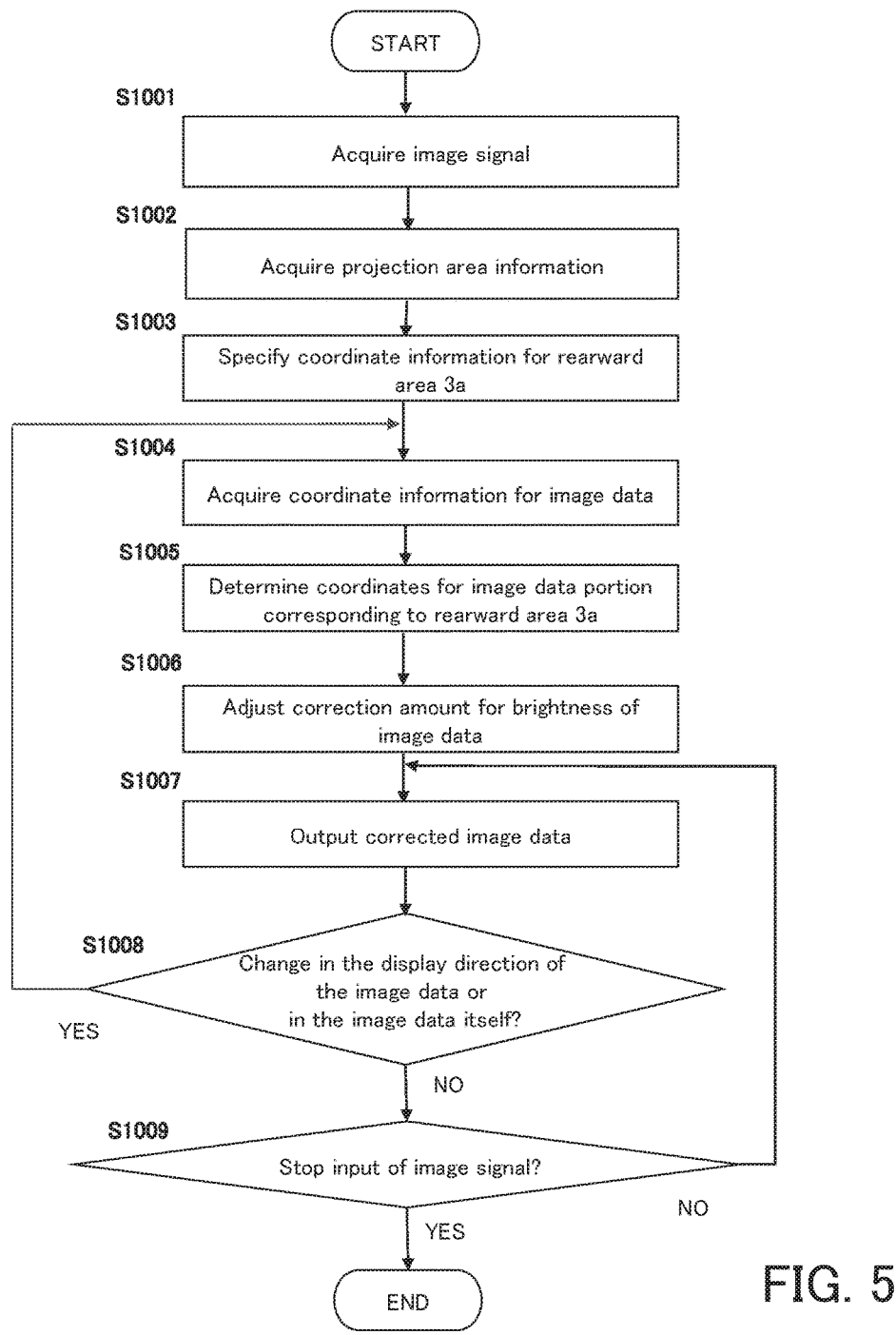
FIG. 5 is a flowchart of the processing performed by an image processing unit pertaining to Embodiment 1.

In this case, the image processor 11 of the image processing unit 10 (FIG. 4) of the projector 1-1 acquires pre-stored coordinate data about the overlapping area OL, in addition to the processing pertaining to Embodiment 1 above (FIG. 5). The image processor 11 adjusts the correction amount for the brightness of the image data portion projected into the overlapping area OL, in addition to adjusting the correction amount for the brightness of the image data in the above embodiment (S1003 to S1006 in FIG. 5). Here, adjusting the correction amount for the brightness of the image data means adjusting the correction amount for the brightness in the image data portion in the overlapping area OL and the correction amount for the brightness in the image data portion of the rearward area 3-1a other than the overlapping area OL, just as in Embodiment 1 above.

The brightness correction amount is, for example, a value based on the difference between the brightness of the image data portion prior to correction by the image processor 11 and the brightness of the image data portion after correction. The brightness of the image data portion in each area (the overlapping area OL, another area, etc.) may be acquired, for example, from the median value for brightness in each area, the average value, the sum total, or another such statistical value.

The image processor 11 corrects the image data so as to further satisfy a second certain condition. The second certain condition here is that the correction amount C for the brightness of the image data portion projected into the overlapping area OL and the correction amount D for the brightness of the other image data portion in the rearward area 3-1a satisfy the relation C<D. The correction amount is a positive value when the brightness is to be raised, and is a negative value when the brightness is to be lowered.

Just as in Embodiment 1 above, the brightness correction amounts C and D may include the correction amount obtained by brightness correction for some other purpose, or may not include the correction amount obtained by brightness correction for some other purpose, with the correction amount D set to zero and the correction amount C calculated.

As a result of adjusting the correction amount, the brightness of the image data portion projected in the overlapping area OL becomes lower than the brightness of the image data portion prior to correction (the brightness adjusted by means of the correction amount A1 in Embodiment 1 above and the correction amount produced by brightness correction for some other purpose). For example, the correction amount is adjusted so that the brightness of the image data portion in the overlapping area OL after correction will be at least 90% and less than 100% of the brightness prior to this correction. In other words, a correction amount that is the difference between the correction amount C and the correction amount D corresponds to the amount by which the brightness of the image data is reduced within a range of at least 90% and less than 100% between before and after correction.

In the modification example above, some or all of the rearward area 3-1a overlaps the other projection area 3-2, which results in the overlapping area OL being brighter, so the value of the correction amount for the brightness of this overlapping area OL is corrected to be further lower than the value of the correction amount in the other area in the rearward area 3-1a. Consequently, brightness unevenness produced by overlapping of the projection areas 3 can be reduced, and the projected image looks to have a more uniform brightness.

Embodiment 2

A projector 21 (an example of an image projection apparatus) pertaining to Embodiment 2 will now be described through reference to FIGS. 7 and 8.

Just as in Embodiment 1, the projector 21 projects image light into the projection area 3 provided on the ceiling CL, so the projection light PL is projected obliquely upward through a projection aperture 21a. As discussed in Embodiment 1, one or more mirrors provided near the projection aperture 21a make it possible to project obliquely upward.

Figure 7:
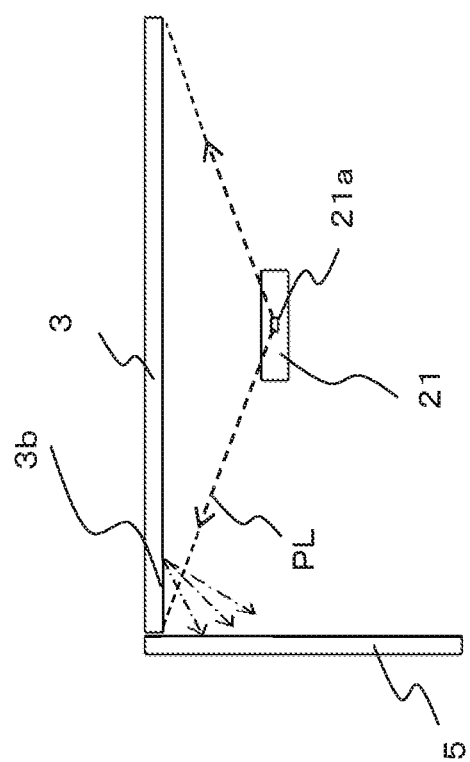
FIG. 7 is a simplified view of the layout of a projector pertaining to Embodiment 2.
Figure 8:
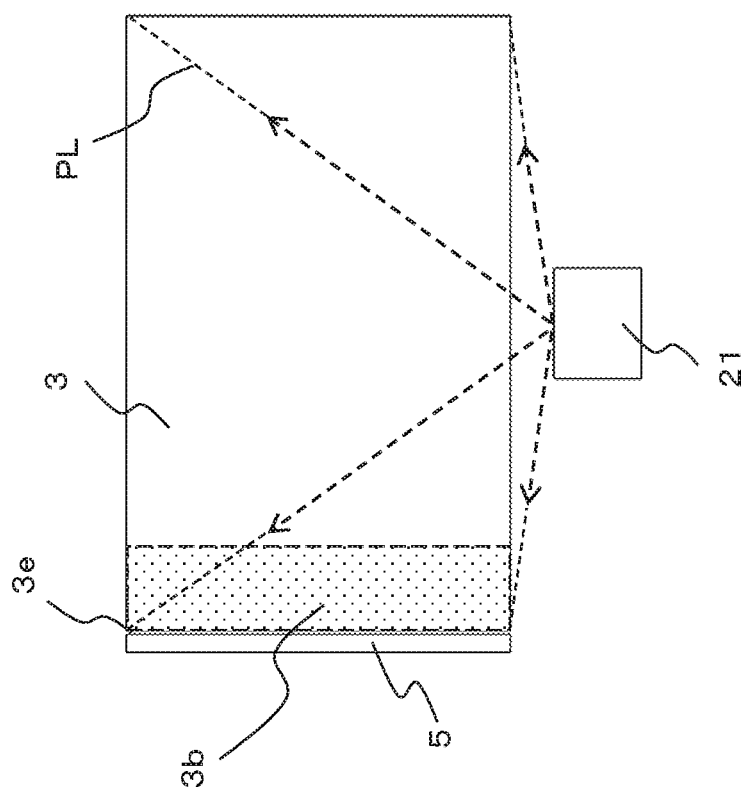
FIG. 8 shows the layout of the projection area and the projector in FIG. 7, as seen from below.

As shown in FIG. 7, however, when the projection area 3 provided to the ceiling CL is close to a wall 5 that intersects the projection area 3, the projection light PL projected toward the wall 5 will be reflected by the ceiling CL, and the reflected image will be projected onto the wall 5, the result being that a noise image appears on the wall 5. To prevent this, in this embodiment the projection light PL that is projected into a near-wall area 3b (FIG. 8), which is part of the projection area 3 and extends from the end 3e closest to the wall 5, is made darker than the other area, thereby reducing reflection onto the wall 5.

The configuration and operation of the projector 21 pertaining to this embodiment will now be described. The configuration, function, operation, and so forth of components that are the same as in Embodiment 1 above will not be described again or depicted in the drawings.

2-1. Configuration

Figure 9:
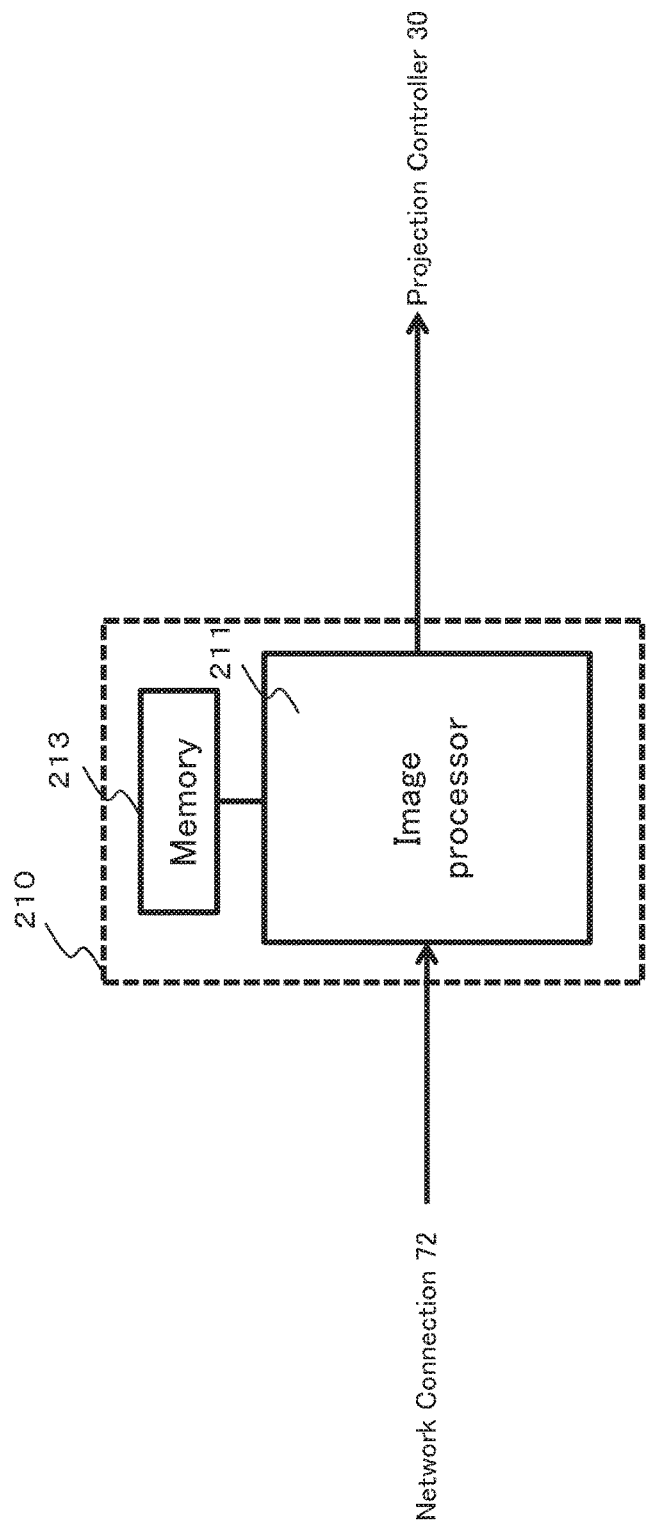
FIG. 9 is a simplified view of the configuration of the image processing unit pertaining to Embodiment 2.

As shown in FIG. 9, an image processing unit 210 (an example of an image processing device) of the projector 21 pertaining to this embodiment comprises an image processor 211 (an example of an image processing component) and a memory 213 (an example of a memory). The image processor 211 executes the operation discussed below according to a specific program stored in the memory 213.

Projection Area Information

Projection area information includes information about whether or not a projection area is a near-wall area, in addition to the projection area information that is the same as in Embodiment 1. This information may be stored ahead of time in the memory 213, etc., when the projector 21 is installed, for example.

2-2. Operation

Figure 10:
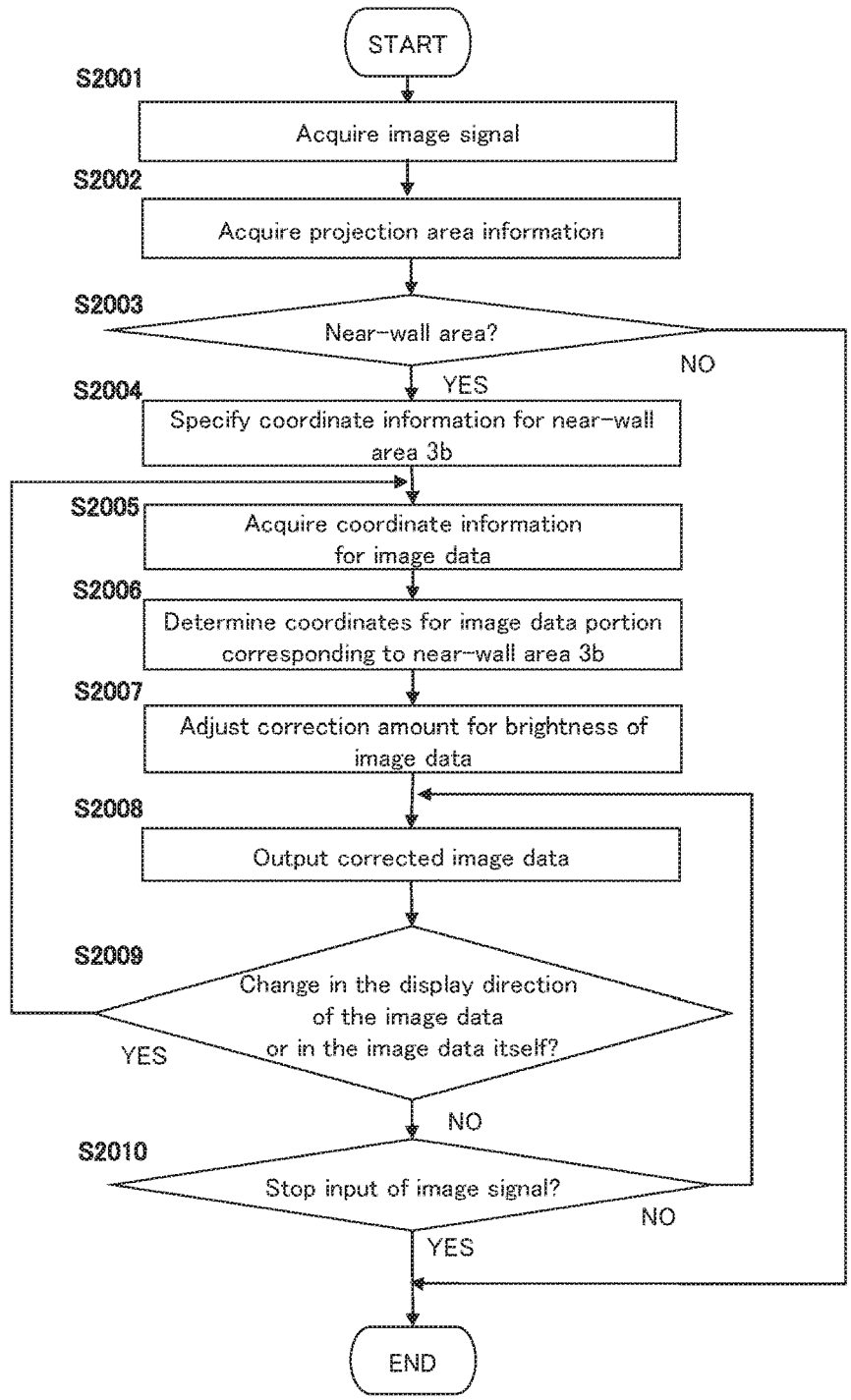
FIG. 10 is a flowchart of the processing performed by an image processing unit pertaining to Embodiment 2.

The operation including brightness correction processing performed mainly by the image processing unit 210 of the projector 21 will now be described through reference to the flowchart in FIG. 10. In the following description, of the image processing executed by the image processing unit 210, we will describe brightness correction processing of the image data. Other image processing shall be assumed to be executed when needed after an image signal has been acquired, and will not be described here. Also, the following image processing may be executed in place of the image processing (FIG. 5) pertaining to Embodiment 1, or may be executed additionally.

S2001: First, with the power switched on, the image processor 211 of the image processing unit 210 of the projector 21 acquires an image signal (video signal) via the connection 72. The acquired image signal is stored in frame units in the memory 213 as image data.

S2002: The image processor 211 acquires projection area information.

S2003: The image processor 211 determines whether or not a projection area is a near-wall area from the acquired projection area information, and if it is a near-wall area, the flow proceeds to step S2004, and otherwise the processing is ended.

S2004: The image processor 211 acquires coordinate information for the near-wall area 3b from among the coordinate information for the projection area 3.

S2005: The image processor 211 acquires coordinate information for the image data from the memory 213. This coordinate information for the image data is produced so as to be compatible with the coordinate information for the projection area 3.

S2006: The image processor 211 determines the coordinates of the image data portion corresponding to the near-wall area 3b.

S2007: The image processor 211 adjusts the correction amount for brightness of the image data on the basis of the determination of the coordinates of the image data portion corresponding to the near-wall area 3b, just as in Embodiment 1. Here, adjusting the correction amount for brightness of the image data means adjusting the correction amount for brightness in the image data portion in the near-wall area 3b, and the correction amount for brightness in the other image data portion in the projection area 3.

The brightness correction amount is, for example, a value based on the difference between the brightness of the image data portion prior to correction by the image processor 211 and the brightness of the image data portion after correction. The brightness of the image data portion in each area (the near-wall area 3b, another area, etc.) may be acquired, for example, from the median value for brightness in each area, the average value, the sum total, or another such statistical value.

The image processor 211 corrects the image data so as to satisfy a certain condition. The certain condition here is that the correction amount A2 for the brightness of the image data portion projected into the near-wall area 3b and the correction amount B2 for the brightness of the other image data portion in the projection area 3 satisfy the relation A2<B2. The correction amount is a positive value when the brightness is to be raised, and is a negative value when the brightness is to be lowered.

The brightness correction amount may be a correction amount that includes the correction amount produced by brightness correction processing for some other purpose (gamma correction or the like; brightness correction executed regardless of the specification of the near-wall area 3b; the same applies hereinafter), or may be a correction amount produced by just brightness correction in the specified near-wall area 3b. In the former case, the correction amount A2 for the brightness of the image data portion projected into the near-wall area 3b and the correction amount B2 for the brightness of the other image data portion in the projection area 3 include the correction amount produced by brightness correction performed for some other purpose. In the latter case, while the correction amount B2 for the brightness of the other image data portion in the projection area 3 is set to zero, the correction amount A2 for the brightness of the image data portion projected into the near-wall area 3b is calculated.

As a result of adjusting the brightness correction amount, the brightness of the image data portion projected into the near-wall area 3b becomes lower than the brightness of this image data portion prior to correction (if the correction amount includes the correction amount produced by brightness correction for some other purpose, then the brightness when this brightness correction has been performed for some other purpose). For example, the brightness in the image data portion of the near-wall area 3b after correction is adjusted so as to be at least 90% and less than 100% of the brightness prior to correction. In other words, the correction amount that is the difference between the correction amount A2 and the correction amount B2 corresponds to the amount by which the brightness of the image data is reduced within the range of at least 90% and less than 100% between before and after correction.

S2008: The image processor 211 outputs an image signal corresponding to the corrected image data to the optical control unit 30. The optical control unit 30 controls the optical unit 50 according to the inputted image signal, and projects image light in the projection area 3.

S2009: The image processor 211 determines whether or not there has been a change in the content of the image data or a change in the orientation of the display of image data, just as in Embodiment 1. If there has been a change, the flow returns to step S2005 and coordinate information is newly acquired for the image data.

S2010: The image processor 211 ends processing if the input of the image signal has stopped, but if the input has not stopped, the flow returns to step S2008 and image data is outputted.

2-3. Features, Etc

The image processing unit 210 (an example of an image processing device) pertaining to this embodiment performs image processing on image data for projecting into the projection area 3 (an example of a projection area), and comprises the memory 213 (an example of a memory) that at least temporarily stores image data, and the image processor 211 (an example of an image processing component). The image processor 211 specifies the near-wall area 3b (an example of a certain area) that is part of the projection area 3 and extends from the end 3e (an example of one end) of the projection area 3, and corrects the image data so as to satisfy a certain condition on the basis of the specification of the near-wall area 3b. The certain condition is that the correction amount A2 for the brightness of the image data portion projected into the near-wall area 3b and the correction amount B2 for the brightness of the other image data portion in the projection area 3 satisfy the relation A2<B2.

If the projection area 3 provided to the ceiling CL is near the wall 5, etc., the projection light PL projected toward the wall 5 will be reflected by the ceiling CL, and the reflected image will be projected onto the wall 5, the result being that a noise image appears on the wall 5. Accordingly, the image processing unit 210 corrects the value of the correction amount for brightness in the image data portion in the near-wall area 3b to be less than the value of the correction amount in the other area, which makes it possible to reduce reflection onto the wall 5 and to reduce the noise image on the wall 5. As a result, the quality of the projection image can be improved.

Other Embodiments

As discussed above, Embodiments 1 and 2 were given as examples of the technology disclosed herein. Nevertheless, the technology disclosed herein is not limited to or by these, and can also be applied to embodiments with modifications, substitutions, additions, omissions, and so forth made as needed. Also, the various constituent elements and functions described in the Embodiments 1 and 2 above can be combined to create new embodiments.

In view of this, other embodiments will now be given.

(1)

In Embodiments 1 and 2 above, the adjustment of the brightness correction amount for image data projected into the rearward area 3a and the near-wall area 3b of the projection area 3 was done uniformly, but this is not the only option. The brightness of the image data in the areas 3a and 3b may have a gradient.

Figure 11:
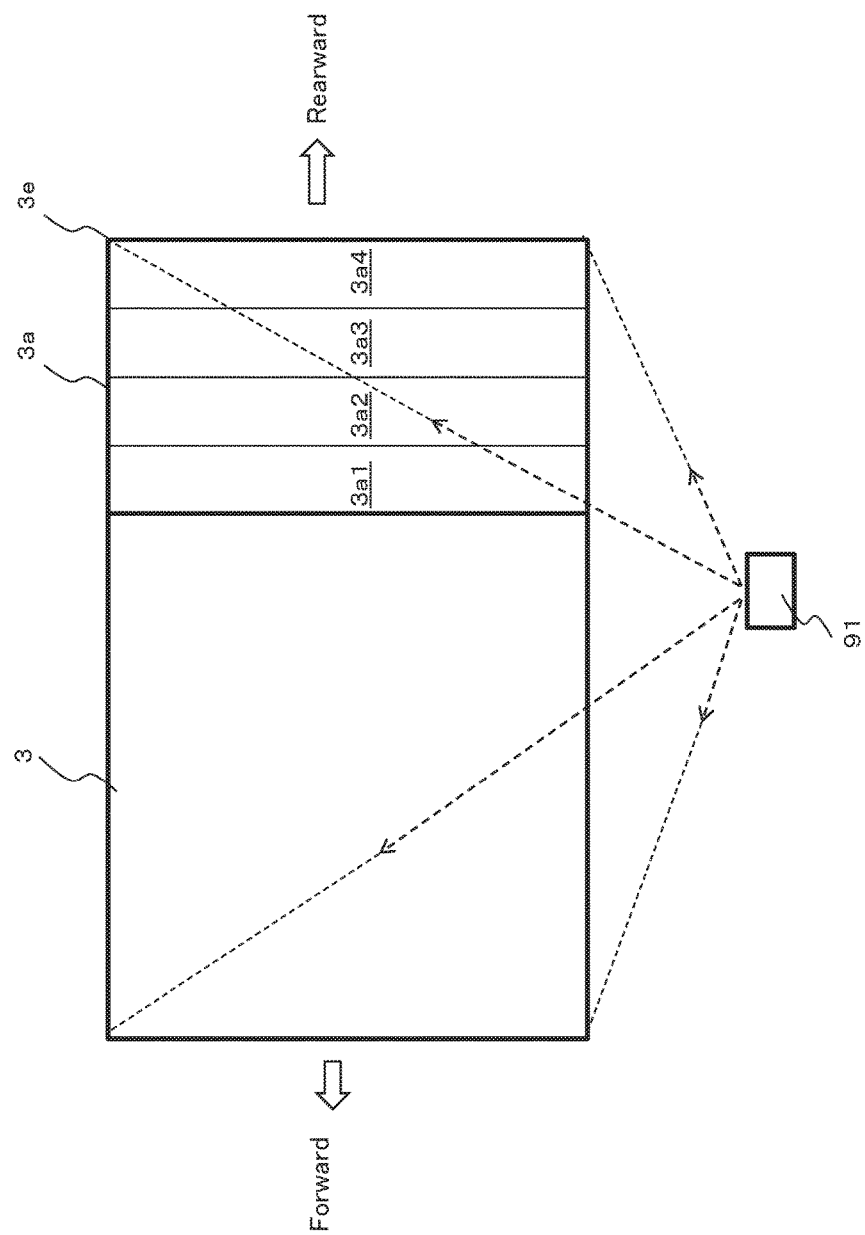
FIG. 11 illustrates another embodiment, and shows the layout of the projection area and a projector as seen from below.

For instance, as shown in FIG. 11, the rearward area 3a in Embodiment 1 may be further divided up into divided areas 3a1, 3a2, 3a3, and 3a4. The correction amount for the brightness of the image data is adjusted so as to vary the brightness correction amount rearward from the divided area 3a1 at the front, that is, so that the image will become darker in stages toward the rear.

The configuration and operation of a projector 91 (an example of an image projection apparatus) pertaining to this embodiment will now be described. The configuration, function, and operation will not be described again when they are the same as in Embodiment 1 or 2 above.

Figure 12:
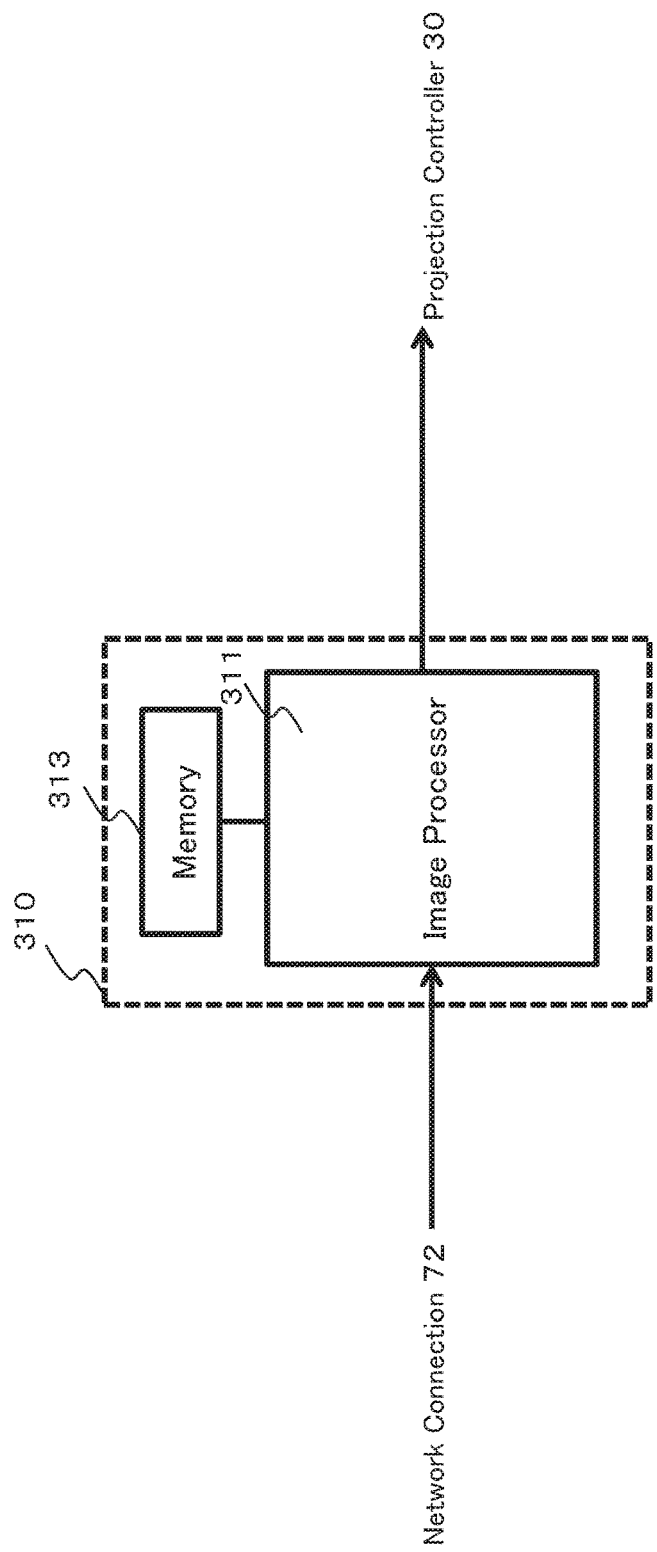
FIG. 12 is a simplified view of the configuration of the image processing unit pertaining to the other embodiment.

As shown in FIG. 12, an image processing unit 310 (an example of an image processing device) of the projector 91 pertaining to this embodiment comprises an image processor 311 (an example of an image processing component) and a memory 313 (an example of a memory). The image processor 311 executes the operation discussed below according to a specific program stored in the memory 313. In the following description, of the image processing executed by the image processing unit 310, we will describe brightness correction processing of the image data. Other image processing shall be assumed to be executed when needed after an image signal has been acquired, and will not be described here.

Figure 13:
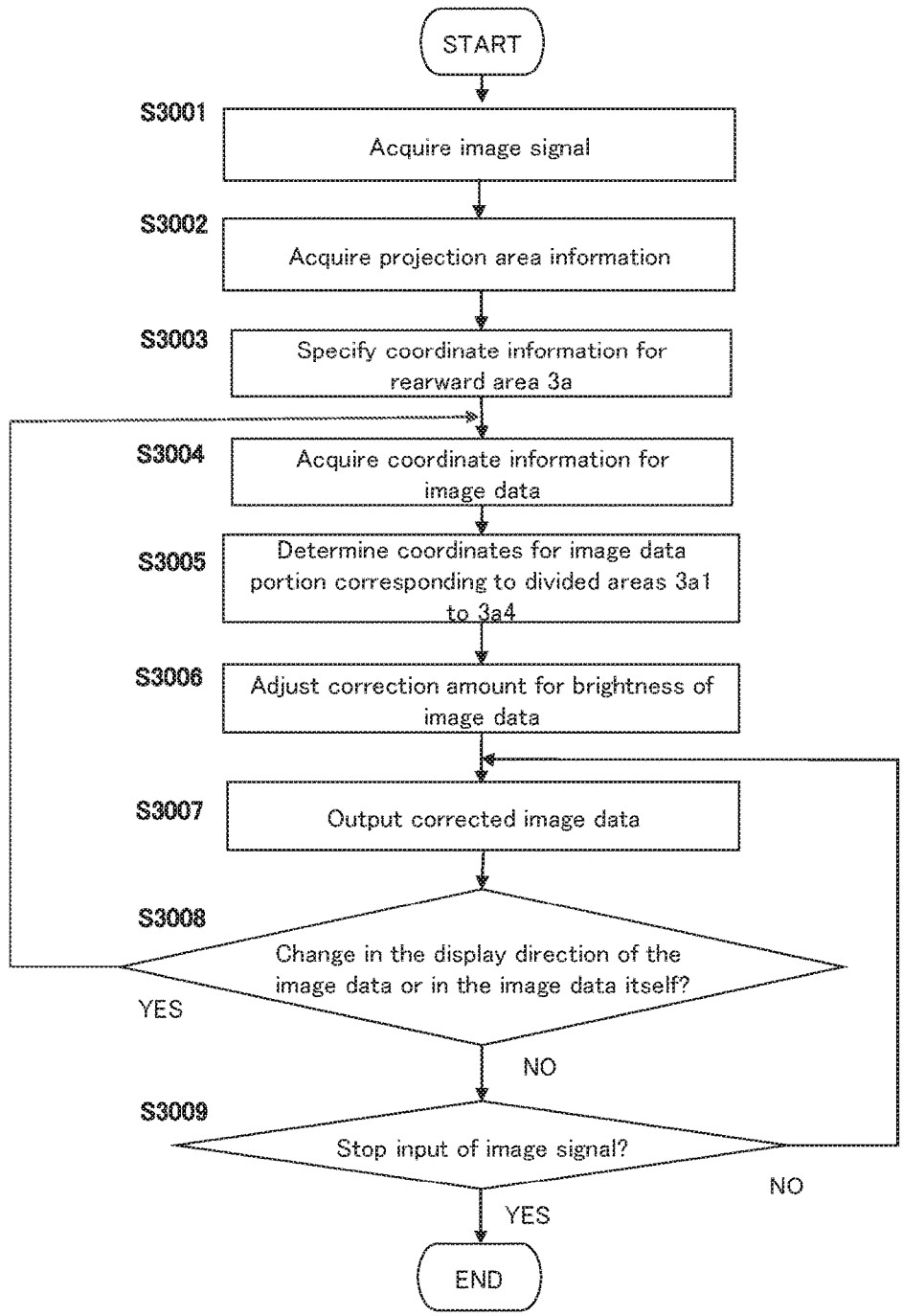
FIG. 13 is a flowchart of the processing performed by an image processing unit pertaining to the other embodiment.

FIG. 13 shows the operation of the image processing unit 310 pertaining to this embodiment. Just as in Embodiment 1, with the power switched on, the image processor 311 acquires an image signal (video signal) via the connection 72 (S3001), and acquires projection area information from the memory 313 (S3002). The coordinate information for the projection area 3 also includes coordinate information for the divided areas 3a1 to 3a4. The image processor 311 specifies the coordinate information for the divided areas 3a1, 3a2, 3a3, and 3a4 (S3003), and meanwhile acquires coordinate information for the image data (S3004). The image processor 311 then determines the coordinates for the image data portion corresponding to the coordinate information of the divided areas 3a1, 3a2, 3a3, and 3a4 (S3005), and adjusts the correction amount for the brightness of the image data portion of the divided areas 3a1, 3a2, 3a3, and 3a4 on the basis of this determination. More specifically, the correction amount for the brightness is adjusted so that the correction amount for the brightness of the divided areas 3a1, 3a2, 3a3, and 3a4 will be less than the correction amount in the other area (S3006), just as in Embodiment 1. Furthermore, the correction amount for the brightness is adjusted so that, of the rearward area 3a, the divided area 3a1 at the front is the brightest and the rearmost divided area 3a4 is the darkest, so that the image becomes darker in stages toward the rear.

The image processor 311 outputs the image signal corresponding to the corrected image data to the optical control unit 30 (S3007). The optical control unit 30 controls the optical unit 50 according to the inputted image signal, and projects image light in the projection area 3. The image processor 311 also determines whether or not there has been a change in the content of the image data or a change in the orientation of the display of image data, just as in Embodiment 1 (S3008). If there has been a change, the flow returns to step S3004 and coordinate information is newly acquired for the image data. The image processor 311 determines whether or not the input of the image signal has stopped (S3009), and if the input has not stopped, the flow returns to step S3007 and image data is outputted.

The number of divided areas is not limited to the above example, and there may be more or fewer than four areas. Furthermore, the sizes of the areas may be the same or different.

Similarly, with the projector 21 pertaining to Embodiment 2, the image processing unit 310 may be provided, the near-wall area 3b may be divided into a number of areas, and a gradient may be imparted to the brightness of the image data portion in these areas. In this case, of the near-wall area 3b, the correction amount is adjusted for the brightness of the image data portion in the near-wall area 3b so that the image will become darker in stages from the divided area farthest away from the wall 5 (FIG. 7) toward the wall 5.

In this embodiment, the brightness correction amount is adjusted so that the image data portion in the rearward area 3a or the near-wall area 3b in which the value of the brightness correction amount is lower than in the other area of the projection area 3 will gradually become darker toward the rear or toward the wall 5 (toward the end 3e from the opposite side of the end 3e shown in FIG. 11). This prevents extreme changes in the image light projected after brightness correction, and affords a more natural projection image.

(2)

With the projectors 1, 21, and 91 pertaining to the above embodiments, the various processing functions of the image processing unit 10 and the optical control unit 30 may be executed, either entirely or some portion thereof, by a control circuit in a CPU (central processing unit), MCU (micro processing unit), or other such microprocessor. Also, the various processing functions may be executed, either entirely or some portion thereof, by a program that is analyzed and executed by a CPU (or an MPU, an MCU, or another such microprocessor), or by hardware involving wired logic. The memory 13 and the memory 33 may be, for example, a RAM (random access memory), a flash memory, or another such semiconductor memory element, or some other such memory device.

The image processors 11, 211, and 311 may be constituted by one or more processors or circuits. The image processing units 10, 210, and 310 may be constituted by one or more semiconductor chips.

(3)

The image processing units 10, 210, and 310 pertaining to the above embodiments may be installed in a separate computer device from that of the projectors 1, 21, and 91, and connected to the projectors 1, 21, and 91.

Also, the image processing units 10, 210, and 310 may be provided to a server (not shown). In this case, the image processing units 10, 210, and 310 may be configured so as to send a plurality of projectors image data that has undergone the brightness correction pertaining to the above embodiments and image processing.

(4)

The programs that execute the operations of the image processing units 10, 210, and 310 (FIGS. 5, 10, and 13) pertaining to the above embodiments may be stored ahead of time in an ROM or the like included in the memory 13, or may be stored in the memory unit of a computer device that is connected to the projectors 1, 21, and 91 and has the function of a server, etc., and may be acquired via the connection 72.

(5)

With the image processing units 10, 210, and 310 pertaining to the above embodiments, if the orientation of the provided image data is fixed, then coordinate information for image data (content images) corresponding to the rearward area 3a, the near-wall area 3b, and the overlapping area OL may be stored ahead of time, and these stored coordinates may be used to perform the above-mentioned brightness correction processing.

(6)

The order in which the operations of the image processing units 10, 210, and 310 (FIGS. 5, 10, and 13) pertaining to the above embodiments are executed is not necessarily limited to what was given in the above embodiments, and the execution order may be changed without departing from the gist of the invention.

(7)

The projectors 1, 21, and 91 pertaining to the above embodiments are examples of being used in an aircraft, but this is not the only option. For example, they may be used in a train, a ship, or the like, or may be used in a facility or the like.

(8)

A DLP projector was used as an example with the projectors 1, 21, and 91 pertaining to the above embodiments, but this is not the only option. Various other types of projector may be used instead, such as a CRT type, an LCD type, or an LCoS (liquid crystal on silicon) type.

(9)

With the projectors 1, 21, and 91 pertaining to the above embodiments, the light source may be a high-pressure mercury vapor lamp, a halogen lamp, a metal halide lamp, or another such lamp, or may be an LED (light emitting diode) or some other such light source.

(10)

The projectors 1, 21, and 91 pertaining to the above embodiments may have a built-in camera. In this case, the camera is used for focal determination of the projection image, projection mapping, and so forth. The camera is disposed at a location where it will not block the projected light.

(11)

The size of the rearward areas 3a and 3a-1 and the near-wall area 3b in the projection area 3 is not limited to what was given in the above embodiments, and may be larger or smaller than what is depicted in the drawings. Preferably, the size is less than 50% of the projection area 3, and more preferably less than 30%.

(12)

The present disclosure is not limited to being worked in the modes of the image processing units 10, 210, and 310. An image processing method or computer program that is executed by the image processing units 10, 210, and 310, and a computer-readable recording medium to which a program is recorded also fall within the scope of the present disclosure. Here, examples of computer-readable recording media include a flexible disk, hard disk, CD-ROM, MO, DVD, DVD-ROM, DVD-RAM, BD (Blu-ray (registered trademark) disc), and semiconductor memory.

The above-mentioned computer program is not limited to being recorded on the above-mentioned recording medium, and may instead be transmitted over an electrical communication line, a wireless or wired communication line, a network such as the Internet, or the like.

What is claimed is:

1. An image processing device that performs image processing on image data for projecting into a projection area located above at least one seat having a front side and a rear side, said device comprising:

a memory that at least temporarily stores the image data; and an image processor that specifies a certain area that is part of the projection area and extends from an end of the rear side of the projection area, and corrects the image data so as to satisfy a certain condition on the basis of the specification of the certain area, wherein the certain condition is that a correction amount A for brightness of an image data portion to be projected into the certain area and a correction amount B for brightness of an image data portion of the front side with respect to the rear side in the projection area satisfy a relation A<B.

2. The image processing device according to claim 1, wherein the image processor determines the image data portion to be projected into the certain area on the basis of coordinate information for the projection area and coordinate information for the image data.

3. The image processing device according to claim 2, wherein, when there is a change in a display direction of the image data or a change in content of the image data, the image processor acquires coordinate information for the image data, and determines the image data portion to be projected into the certain area on the basis of the acquired coordinate information for the image data and the coordinate information for the projection area.

4. The image processing device according to claim 1, wherein the certain area is adjacent to another projection area.

5. The image processing device according to claim 1, wherein the certain area includes an overlapping area that overlaps part of another projection area.

6. The image processing device according to claim 5, wherein the image processor further specifies the overlapping area and corrects the image data so as to satisfy a second certain condition on the basis of the specification of the overlapping area, and the second certain condition is that a correction amount C for brightness of an image data portion to be projected into the overlapping area and a correction amount D for brightness of the other image data portion in the certain area satisfy a relation C<D.

7. The image processing device according to claim 1, wherein the certain area is located near a surface that intersects the projection area.

8. The image processing device according to claim 1, wherein the image processor corrects the image data so that the brightness of the image data portion to be projected into the certain area is lowered in stages from an opposite side of one end of the projection area toward the end.

9. The image processing device according to claim 1, wherein a difference between the correction amount A and the correction amount B corresponds to an amount by which the brightness of the image data portion projected into the certain area is reduced within a range of at least 90% and less than 100% between before and after the correction.

10. The image processing device according to claim 1, wherein the image processor further sets the correction amount A so that, when the correction amount B is set to 0, the brightness of the image data portion after the correction in the certain area with respect to the brightness of the image data portion before the correction in the certain area is at least 90% and less than 100%.

11. The image processing device according to claim 1, wherein the correction amount A and the correction amount B are each a value based on a differential between the brightness of the respective image data portion before the correction and the brightness of the image data portion after the correction made by the image processor.

12. An image projection apparatus, comprising:
the image processing device according to claim 1;
a light source;
an optical system that produces image light from light emitted by the light source, on the basis of the image data;
a projection aperture through which the image light is projected toward the projection area; and
an optical controller that controls the light source and the optical system.

13. The image projection apparatus according to claim 12, wherein a plane of the projection aperture, which is perpendicular to a direction in which the image light is projected, is parallel to a plane that includes the projection area, and the projection aperture is disposed so as not to face the projection area and so that the image light is projected obliquely into the projection area.

14. An image processing method, with which image data for projection into a projection area, located above at least one seat having a front side and a rear side, is subjected to image processing, said method including:

specifying a certain area that is part of the projection area and extends from an end of the rear side of the projection area;

correcting the image data so as to satisfy a certain condition on the basis of the specification of the certain area; and outputting the corrected image data, wherein the certain condition is that a correction amount A for brightness of an image data portion to be projected into the certain area and a correction amount B for brightness of an image data portion of the front side with respect to the rear side in the projection area satisfy a relation A<B.

15. The image processing method according to claim 14, wherein the certain area is adjacent to another projection area.

16. The image processing method according to claim 14, wherein the certain area includes an overlapping area that overlaps part of another projection area.

* * * * *